;(12) United States Patent
Furukawa

(10) Patent No.: US 11,492,010 B2
(45) Date of Patent: Nov. 8, 2022

(54) VEHICLE AND SELF-DRIVING CONTROL DEVICE

(71) Applicant: PANASONIC INTELLECTUAL PROPERTY MANAGEMENT CO., LTD., Osaka (JP)

(72) Inventor: Kazuya Furukawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 17/026,947

(22) Filed: Sep. 21, 2020

(65) Prior Publication Data

US 2021/0001889 A1    Jan. 7, 2021

Related U.S. Application Data

(63) Continuation of application No. PCT/JP2019/010427, filed on Mar. 13, 2019.

(30) Foreign Application Priority Data

Mar. 23, 2018    (JP) .............................. JP2018-056723

(51) Int. Cl.
*B60W 60/00*    (2020.01)
*B60W 40/12*    (2012.01)
*G06V 20/58*    (2022.01)

(52) U.S. Cl.
CPC ........ *B60W 60/0018* (2020.02); *B60W 40/12* (2013.01); *B60W 60/0016* (2020.02);
(Continued)

(58) Field of Classification Search
None
See application file for complete search history.

(56) References Cited

U.S. PATENT DOCUMENTS 10,019,011 B1 * 7/2018 Green ............. B60W 30/18109
2009/0299598 A1    12/2009 Boecker et al.
(Continued)

FOREIGN PATENT DOCUMENTS

CN    104575000    4/2015
CN    104575030    4/2015
(Continued)

OTHER PUBLICATIONS

Radioworld Inc, "Wifi Garmin GPS Map Update" (Dec. 18, 2017). Retrieved from https://www.youtube.com/watch?v=T3wNDXDfvx4 (Year: 2017).*

(Continued)

*Primary Examiner* — James J Lee
*Assistant Examiner* — David Hatch
(74) *Attorney, Agent, or Firm* — Greenblum & Bernstein, P.L.C.

(57) ABSTRACT

A vehicle includes a sensor circuit configured to detect an obstacle in a first region which is located on the predetermined traveling route and in a second region which is adjacent to the first region on the predetermined traveling route, the second region being farther than the first region. The vehicle enters the first region in a case where: there is no obstacle in the first region; and there is no obstacle in the second region, and does not enter the first region and stops before the first region in a case where: there is no obstacle in the first region; and there is an obstacle in the second region.

10 Claims, 11 Drawing Sheets

(52) U.S. Cl.
CPC ............ G06V 20/58 (2022.01); G06V 20/584 (2022.01); *B60W 2554/4042* (2020.02); *B60W 2554/804* (2020.02); *B60W 2556/45* (2020.02)

(56) References Cited

U.S. PATENT DOCUMENTS

| | | | |
|---|---|---|---|
| 2011/0282558 A1* | 11/2011 | Park | B60W 30/143 |
| | | | 701/94 |
| 2013/0304279 A1 | 11/2013 | Mudalige et al. | |
| 2017/0169709 A1* | 6/2017 | Ando | G08G 1/161 |
| 2017/0193384 A1 | 7/2017 | Mudalige et al. | |
| 2017/0329337 A1* | 11/2017 | Kusano | G08G 1/09675 |
| 2017/0349168 A1* | 12/2017 | Meinhart | B60T 7/22 |
| 2017/0352271 A1 | 12/2017 | Aoyagi | |
| 2019/0043353 A1* | 2/2019 | Kim | G05D 1/0274 |

FOREIGN PATENT DOCUMENTS

| | | |
|---|---|---|
| CN | 107111955 | 8/2017 |
| JP | 2006-248361 | 9/2006 |
| JP | 2008-087618 | 4/2008 |
| JP | 2011-126446 | 6/2011 |
| JP | 2011-198142 | 10/2011 |
| RU | 2419163 | 5/2011 |
| WO | 2016/110732 | 7/2016 |
| WO | 2017/038173 | 3/2017 |

OTHER PUBLICATIONS

"Code of Virginia Code—Article 2. Right-of-Way" Dec. 25, 2016 Virginia (Year: 2016).*
Written Opinion of the International Searching Authority issued in International Pat. Appl. No. PCT/JP2019/010427, dated May 14, 2019.
International Search Report issued in International Pat. Appl. No. PCT/JP2019/010427, dated May 14, 2019, along with an English translation thereof.
Official Action dated Dec. 21, 2021 issued in Chinese patent application No. 201980020642.9 along with corresponding English translation.

* cited by examiner

VEHICLE AND SELF-DRIVING CONTROL DEVICE

CROSS-REFERENCE TO RELATED APPLICATIONS

This application is a continuation of PCT International Patent Application No. PCT/JP2019/010427 filed on Mar. 13, 2019, which claims the benefit of priority of Japanese Patent Application No. 2018-056723 filed on Mar. 23, 2018, the enter contents of which are incorporated herein by reference.

FIELD

The present disclosure relates to a vehicle capable of autonomously traveling on a predetermined traveling route and a self-driving control device used in the vehicle.

BACKGROUND

In recent years, development of vehicles capable of autonomously traveling on a predetermined traveling route has been advanced. As a technique related to self-driving, there is a technique for reducing malfunctions at an intersection or in the vicinity of the intersection, as described in JP-A-2011-126446, for example.

JP-A-2011-126446 discloses a technique in which a brake operation unit is controlled to generate a braking force on a vehicle. If it is determined that a position of a host vehicle or a position of the obstacle is inside an intersection or in the vicinity of the intersection, the brake operation unit is controlled by stationary object brake control regardless of a state of the obstacle, as in a case where an obstacle is stationary. The stationary object brake control is started later than moving object brake control.

SUMMARY

An object of the present disclosure is to provide a vehicle which can safely traveling at an intersection, a sidewalk, and a pedestrian crossing, and a self-driving control device.

A vehicle according to the present disclosure includes: a power unit which is electrically controllable; a steering device which is electrically controllable; a braking device which is electrically controllable; a sensor circuit configured to detect an external obstacle; a processor; and a memory storing a program. The vehicle is configured to autonomously travel on a predetermined traveling route by electrically controlling at least one of the power unit, the steering device, and the braking device. The sensor circuit is configured to detect the obstacle in a first region which is located on the predetermined traveling route and in a second region which is adjacent to the first region on the predetermined traveling route, the second region being farther than the first region. The program, when executed by the processor, causes the processor to perform control such that vehicle enters the first region in a case where: there is no obstacle in the first region; and there is no obstacle in the second region, and perform control such that the vehicle does not enter the first region and stops before the first region in a case where: there is no obstacle in the first region; and there is an obstacle in the second region.

According to the present disclosure, obstacles outside the vehicle, such as vehicles, motorcycles, people, bicycles, and wheelchairs, are detected in the first region on a planned future route and in the second region which is adjacent to the first region and is farther than the first region. The vehicle enters the first region in a case where there is no obstacle in both the first and the second regions. The vehicle does not enter the first region and stops before the first region in a case where there is no obstacle in the first region while there is an obstacle in the second region.

Therefore, assuming that the first region is an intersection, a sidewalk, or a pedestrian crossing, the vehicle stops before the first region in a situation where the host vehicle cannot enter the second region after the vehicle has passed the first region, so that the vehicle can avoid dangerous situations, such as being stuck at the intersection, the sidewalk, or the pedestrian crossing.

A self-driving control device according to the present disclosure is mountable on a vehicle. The vehicle includes: a power unit which is electrically controllable; a steering device which is electrically controllable; a braking device which is electrically controllable; and a sensor circuit configured to detect an external obstacle. The vehicle is configured to autonomously travel on a predetermined traveling route by electrically controlling at least one of the power unit, the steering device, and the braking device. The sensor circuit configured to detect the obstacle in a first region which is located on the predetermined traveling route and in a second region which is adjacent to the first region on the predetermined traveling route, the second region being farther than the first region. The self-driving control device includes a processor and a memory storing a program. The program, when executed by the processor, causes the processor to perform control such that the vehicle enters the first region in a case where: there is no obstacle in the first region; and there is no obstacle in the second region, and perform control such that the vehicle does not enter the first region and stops before the first region in a case where: there is no obstacle in the first region; and there is an obstacle in the second region.

According to the present disclosure, obstacles outside the vehicle, such as vehicles, motorcycles, people, bicycles, and wheelchairs, are detected in the first region on a planned future route and in the second region which is adjacent to the first region and is farther than the first region. The self-driving control device performs control such that the vehicle enters the first region in a case where there is no obstacle in both the first and the second regions. The self-driving control device performs control such that the vehicle does not enter the first region and stops before the first region in a case where there is no obstacle in the first region while there is an obstacle in the second region.

Therefore, assuming that the first region is an intersection, a sidewalk, or a pedestrian crossing, the self-driving control device performs control such that the vehicle stops before the first region in a situation where the host vehicle cannot enter the second region after the vehicle has passed the first region, so that the vehicle can avoid dangerous situations, such as being stuck at the intersection, the sidewalk, or the pedestrian crossing.

DETAILED DESCRIPTION

Hereinafter, embodiments (hereinafter, referred to as "the present embodiment") that specifically discloses a vehicle and a self-driving control device according to the present disclosure will be described in detail with reference to the drawings as appropriate. However, unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Hereinafter, preferred embodiments for carrying out the present disclosure will be described in detail with reference to the drawings. Although the following embodiments are applied to a left-hand traffic, the present disclosure may be applicable to a right-hand traffic.

First Embodiment

Figure 1:
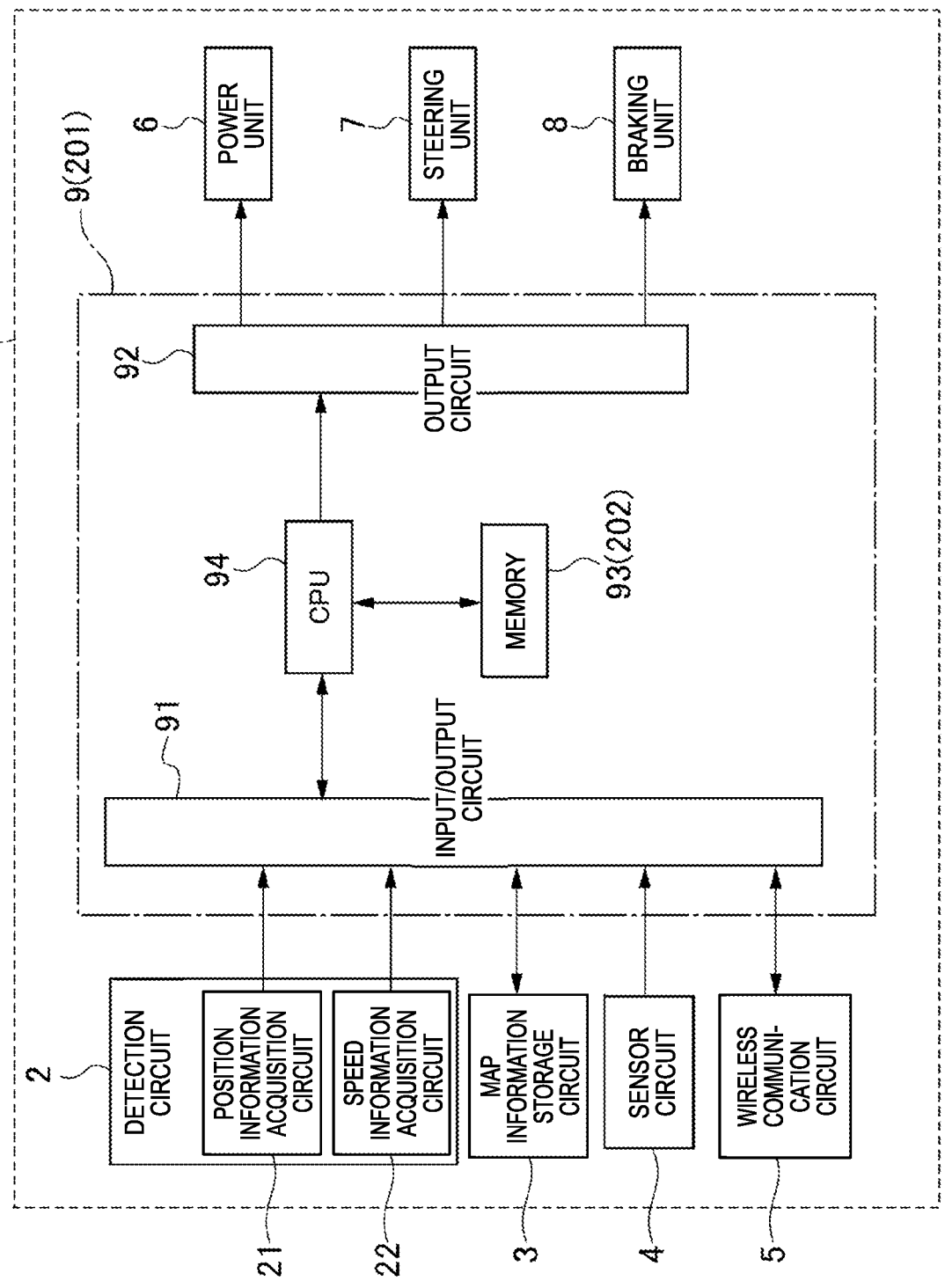
FIG. 1 is a block diagram showing a configuration of a portion related to self-driving of a vehicle of a first embodiment.

Hereinafter, a vehicle 1 of a first embodiment will be described with reference to FIG. 1. FIG. 1 is a block diagram showing a configuration of a portion related to self-driving of the vehicle 1 of the first embodiment. In FIG. 1, the vehicle 1 includes: a detection circuit 2 that detects a position and a speed of the vehicle 1; a map information storage circuit 3 that stores map information; a sensor circuit 4 that detects an obstacle existing outside the vehicle 1; a wireless communication circuit 5 that is capable of wirelessly communicating with the outside; an electrically controllable power unit 6; an electrically controllable steering unit 7 (an example of an steering device); an electrically controllable braking unit 8 (an example of a braking device); and a self-driving control device 9 that electrically controls the power unit 6, the steering unit 7 and the braking unit 8 and causes the vehicle 1 to autonomously travel on a predetermined traveling route.

Figure 2A:
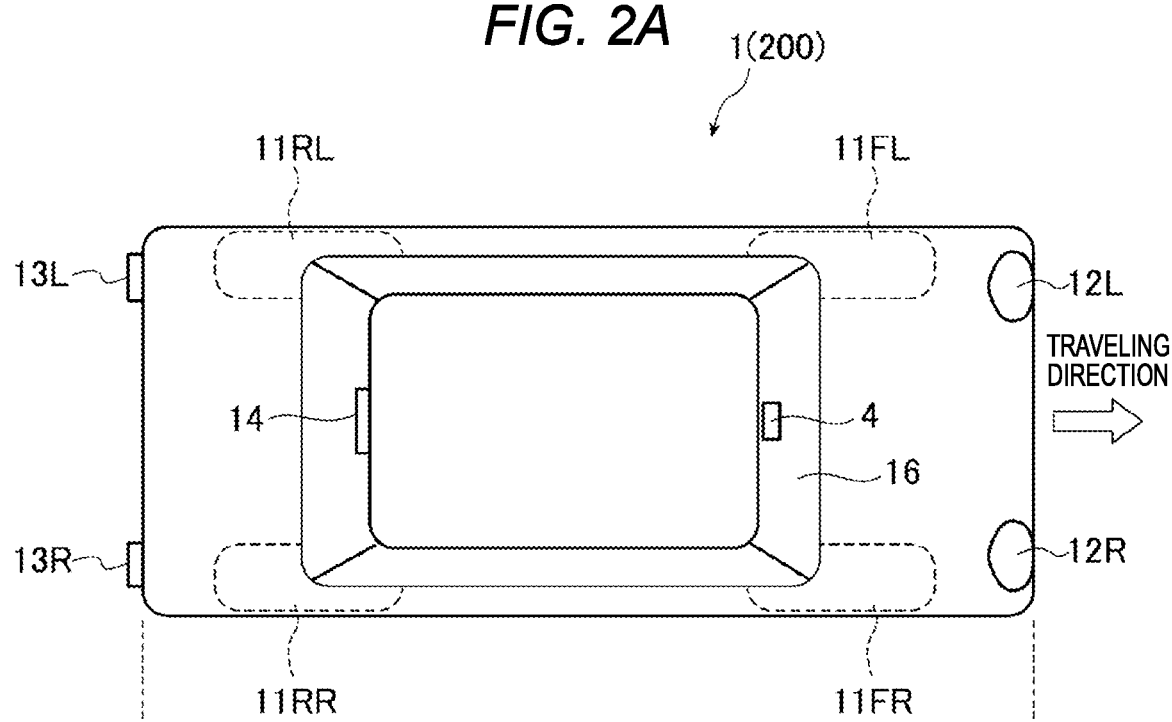
FIGS. 2A and 2B are a plan view and a side view of the vehicle of the first embodiment.
Figure 2B:
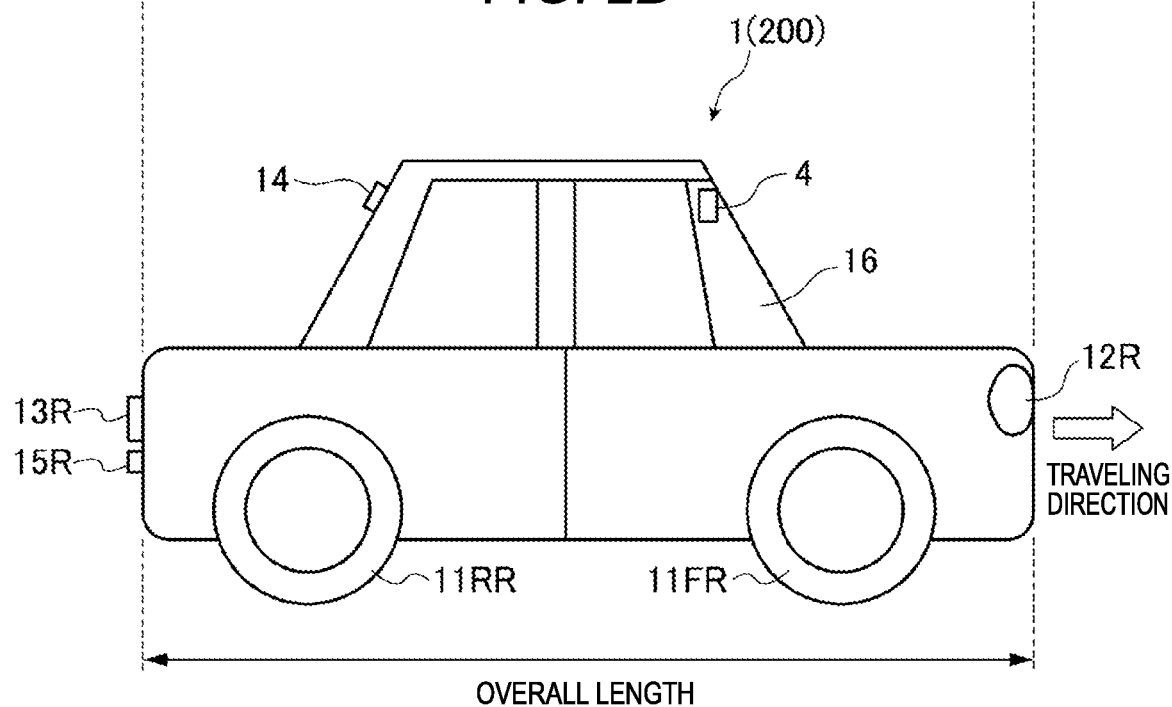
Figure 3:
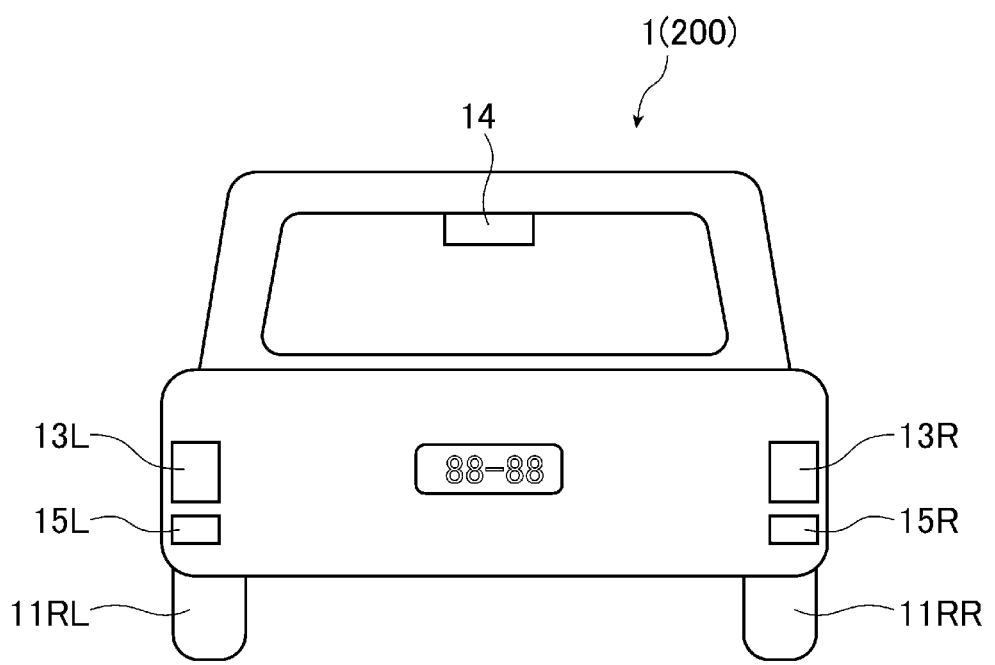
FIG. 3 is a rear view of the vehicle of the first embodiment.

FIG. 2A is a plan view of the vehicle 1, and FIG. 2B is a side view of the vehicle 1. FIG. 3 is a rear view of the vehicle 1. The vehicle 1 includes: left and right front wheels 11FL, 11FR and left and right rear wheels 11RL, 11RR; left and right headlights 12L, 12R arranged on a front side; left and right brake lamps 13L, 13R arranged on a rear side; a brake lamp 14 arranged on an upper center portion of the rear side; and left and right winker lamps 15L, 15R arranged on the rear side. The sensor circuit 4 is arranged at an upper center of a front glass 16 of the vehicle 1 on a vehicle interior side.

Referring back to FIG. 1, the detection circuit 2 includes a position information acquisition circuit 21 and a speed information acquisition circuit 22. The detection circuit 2 acquires position information of the vehicle 1 by the position information acquisition circuit 21, and acquires speed information of the vehicle 1 by the speed information acquisition circuit 22. The detection circuit 2 outputs the acquired position information and speed information of the vehicle 1 to the self-driving control device 9. The map information storage circuit 3 includes a flash ROM which is read-only and capable of electrically erasing and rewriting data, and stores the map information. The map information storage circuit 3 outputs the map information to the self-driving control device 9 in response to a map information request from the self-driving control device 9. The map information stored in the map information storage circuit 3 is rewritable with other map information input via the wireless communication circuit 5. The sensor circuit 4 includes: a camera; a millimeter wave radar; a LIDAR (light detection and ranging, laser imaging detection and ranging); a sonar; a temperature sensor; a barometric pressure sensor; a humidity sensor, an illuminance sensor, and the like. The sensor circuit 4 outputs various detection results to the self-driving control device 9.

The wireless communication circuit 5 performs road-vehicle communication and receives a signal transmitted from a road side device (not shown). Known techniques can be used for the road-vehicle communication. The wireless communication circuit 5 outputs the received signal to the self-driving control device 9. The wireless communication circuit 5 may be applicable to a mobile phone communication system, a wireless metropolitan area network (WMAN), or the like, and may perform wireless communication with a data server, an infrastructure, another vehicle, a pedestrian, or the like.

The power unit 6 includes an engine (not shown) of the vehicle 1 and a control unit that electrically controls output of the engine. The power unit 6 moves the vehicle 1. During self-driving, output of the power unit 6 changes under control of the self-driving control device 9. The power unit 6 may include a motor (not shown) or may include both the engine and the motor, and in the configuration, similarly, the output of the engine and the motor is controlled by the self-driving control device 9. The steering unit 7 is a steering device configured to change a traveling direction of the vehicle 1 as desired. During the self-driving, a steering angle of the steering unit 7 changes under the control of the self-driving control device 9. The braking unit 8 is a device that decelerates or stops the vehicle 1 during traveling. During the self-driving, a braking force of the braking unit 8 changes under the control of the self-driving control device 9.

The self-driving control device 9 includes: an input/output circuit 91; an output circuit 92; a memory 93; and a CPU 94. The input/output circuit 91 functions as an interface that electrically connects the detection circuit 2, the map information storage circuit 3, the sensor circuit 4 and the wireless communication circuit 5 to the CPU 94. The output circuit 92 functions as an interface that electrically connects the power unit 6, the steering unit 7 and the braking unit 8 to the CPU 94. The memory 93 includes: a ROM dedicated to data reading (not shown); a RAM capable of rewriting data (not shown); and a read-only flash ROM capable of electrically erasing and rewriting data (not shown). The ROM stores a basic program configured to start the CPU 94 when power is turned on. The RAM is used in an operation of the CPU 94, and the flash ROM stores a program that supports self-driving control of the vehicle 1.

The CPU 94 cooperates with the memory 93 to perform control related to the self-driving. That is, the CPU 94 acquires the position information and the speed information from the detection circuit 2, acquires the map information from the map information storage circuit 3, further acquires the various detection results detected by the sensor circuit 4, acquires the signal received by the wireless communication circuit 5, controls the power unit 6, the steering unit 7 and the braking unit 8 via the output circuit 92 based on the acquired position information, speed information, map information, sensor information, and information of the road side device (not shown), and thus causes the vehicle to autonomously travel on the predetermined traveling route. In particular, the vehicle 1 of the first embodiment can travel safely in dangerous regions, such as intersections, sidewalks and pedestrian crossings. For example, if a vehicle continues to travel in a case where a region beyond an intersection is blocked, the vehicle will get stuck in the intersection, which is dangerous. According to the vehicle 1 of the first embodiment, control is performed to avoid such dangerous situations.

In the present disclosure, a region with danger, such as an intersection, a sidewalk, or a pedestrian crossing, is referred to as a "danger region", and a region beyond the danger region is referred to as an "exit region". The exit region is a region that does not correspond to at least an intersection, a pedestrian crossing, and a sidewalk, and is a region on a roadway in the present disclosure. Moreover, in the present disclosure, a length of the exit region is longer than an overall length of the vehicle 1 and shorter than twice the overall length of the vehicle 1 in a direction along the traveling route of the roadway. The danger region corresponds to a first region, and the exit region corresponds to a second region. The first region and the second region are associated with the map information stored in the map information storage circuit 3.

Figure 4A:
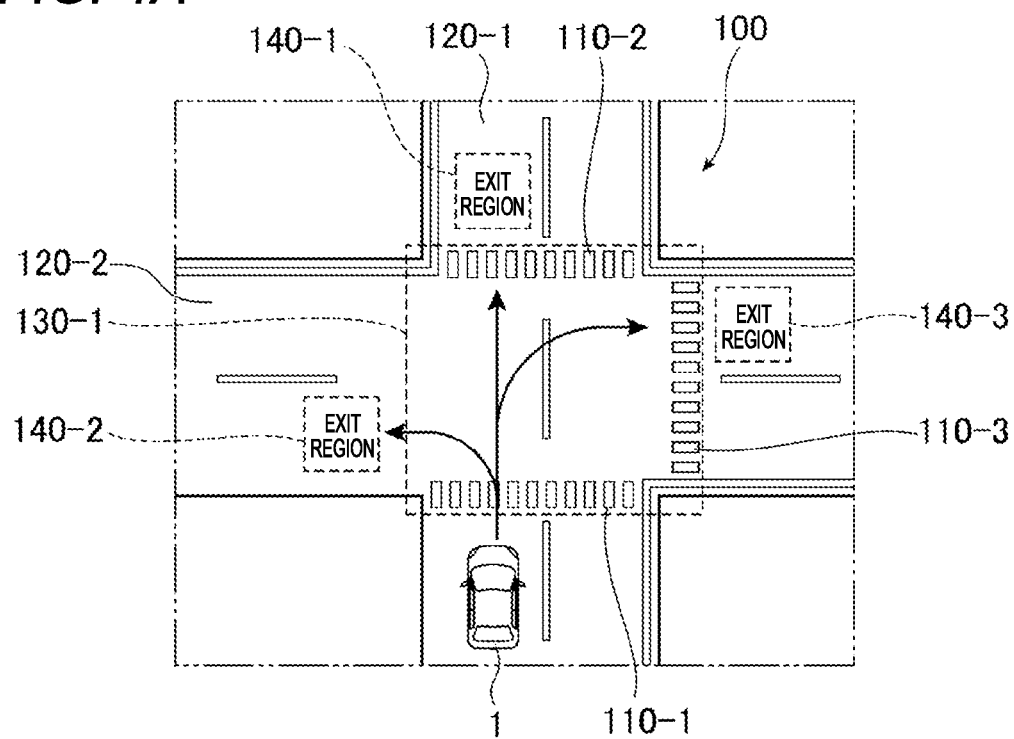
FIGS. 4A and 4B show an example of a dangerous situation during traveling of the vehicle.

FIGS. 4A and 4B and FIGS. 5A and 5B show an example of a dangerous situation during traveling of the vehicle 1. FIG. 4A shows a situation where the vehicle 1 is about to pass through an intersection 100. In FIG. 4A, the intersection 100 is a danger region 130-1. A region on a roadway 120-1, which is straight ahead of a pedestrian crossing 110-1 and is adjacent to a pedestrian crossing 110-2, is referred to as an exit region 140-1. A region on a roadway 120-2, which is leftward ahead of the pedestrian crossing 110-1 and is adjacent to the pedestrian crossing 110-1, is referred to as an exit region 140-2. A region on the roadway 120-2, which is rightward ahead of the pedestrian crossing 110-1 and is adjacent to a pedestrian crossing 110-3, is referred to as an exit region 140-3.

In a situation where the exit region 140-1 is blocked, the vehicle will get stuck on the pedestrian crossing 110-2 when the vehicle continues to go ahead. In a situation where the exit region 140-2 is blocked, the vehicle will get stuck on the pedestrian crossing 110-1 when the vehicle tries to turn left. In a situation where the exit region 140-3 is blocked, the vehicle will get stuck on the pedestrian crossing 110-3 when the vehicle tries to turn right. If the vehicle gets stuck on the pedestrian crossing 110-2 or on the pedestrian crossing 110-3, crossing of a pedestrian may be obstructed, and traveling of another vehicle may be obstructed after a signal change.

Figure 4B:
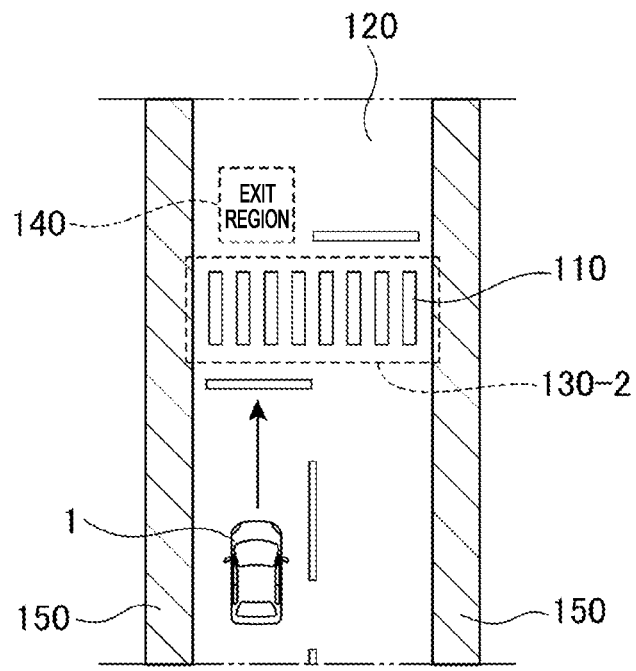

FIG. 4B shows a situation where the vehicle 1 is about to pass through a pedestrian crossing 110 on a general road. In FIG. 4B, the pedestrian crossing 110 is a danger region 130-2, and a region on a roadway 120, which is adjacent to the pedestrian crossing 110 and is farther than the pedestrian crossing 110, is referred to as an exit region 140. In the case of such an example, in a situation where the exit region 140 is blocked, the vehicle will get stuck on the pedestrian crossing 110 in the same manner as in the case of the going ahead of FIG. 4A when the vehicle continues to go ahead. In the example shown in FIG. 4B, there are sidewalks 150 on two sides of the roadway 120.

Figure 5A:
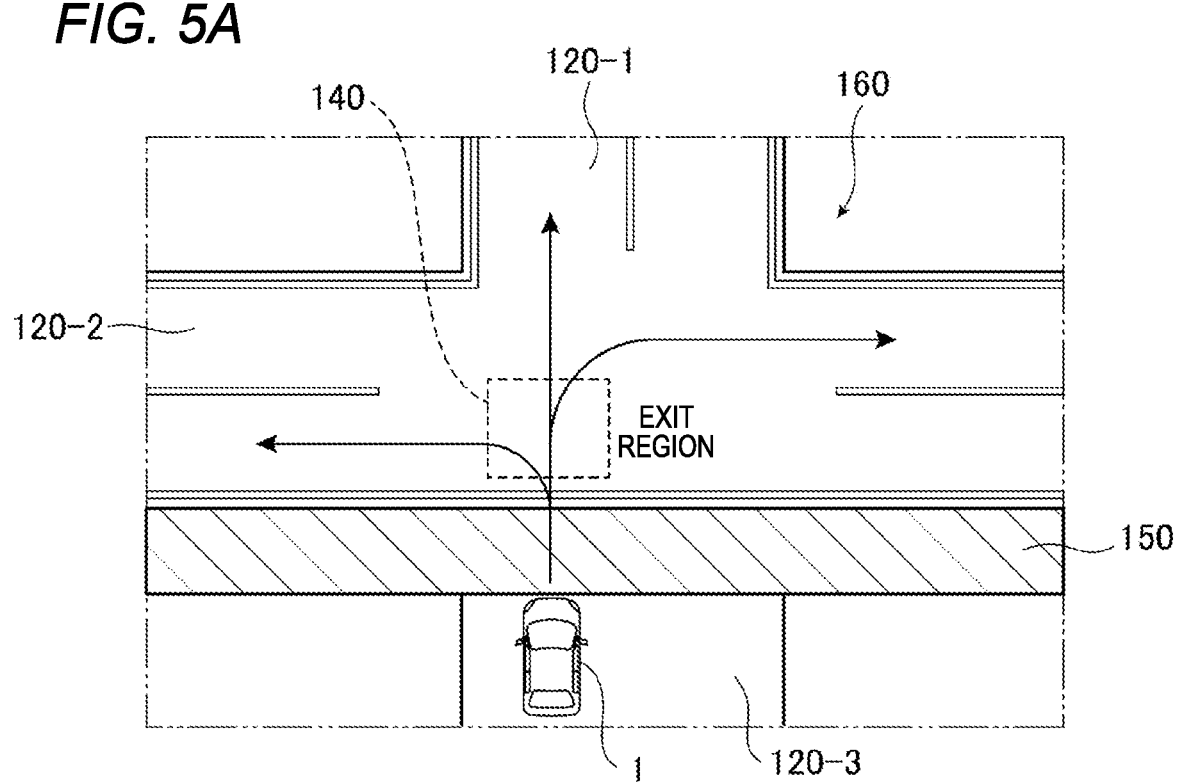
FIGS. 5A and 5B show an example of the dangerous situation during the traveling of the vehicle.

FIG. 5A shows a situation where the vehicle 1 is about to pass through the sidewalk 150 from a roadway 120-3 and enter the roadway 120 at an intersection 160. In FIG. 5A, the sidewalk 150 is the danger region, and a region on the roadway 120, which is adjacent to the sidewalk 150 and is farther than the sidewalk 150, is referred to as the exit region 140. In the case of such an example, in a situation where the exit region 140 on the roadway 120-2 is blocked, the vehicle will get stuck on the sidewalk 150, which is the danger region, when the vehicle continues to go ahead.

Figure 5B:
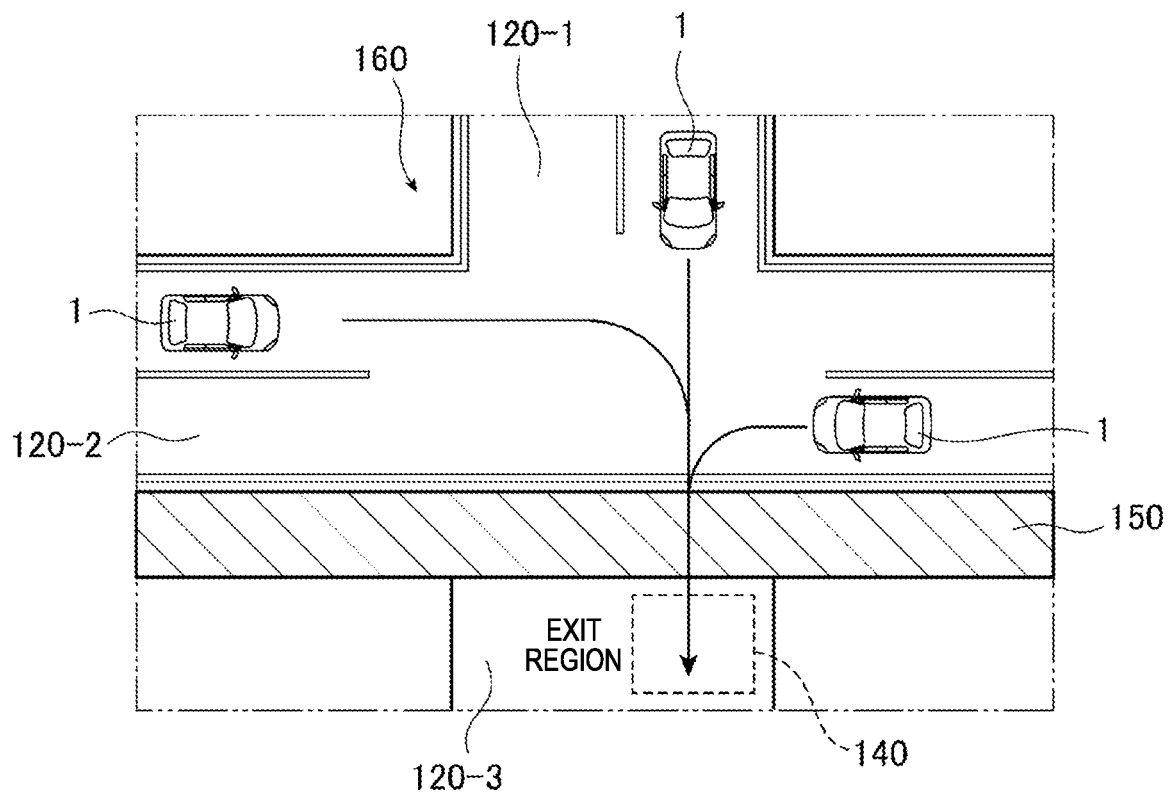

FIG. 5B shows a situation where the vehicle 1 is about to pass through the sidewalk 150 from the intersection 160 and enter the roadway 120-3. In FIG. 5B, the sidewalk 150 is the danger region, and a region on the roadway 120-3, which is adjacent to the sidewalk 150 and is farther than the sidewalk 150, is referred to as the exit region 140. In the case of such an example, in a situation where the exit region 140 adjacent to the sidewalk 150 is blocked, the vehicle will get stuck on the sidewalk 150 when the vehicle continues to go ahead.

Next, control of the self-driving control device 9 will be described in detail.

Based on the sensor information from the sensor circuit 4, the self-driving control device 9 sets a region that corresponds to at least one of an intersection, a pedestrian crossing, or a sidewalk on the planned future route as the danger region, and sets a region that is adjacent to the danger region and is farther than the danger region as the exit region. The planned future route is a route where the vehicle plans to travel in the future, and is not a route traveled in the past. The sensor circuit 4 detects obstacles outside the vehicle such as vehicles, motorcycles, people, bicycles, and wheelchairs in both the danger region and the exit region. The sensor circuit 4 may also detect obstacles outside the danger region serving as the first region, and the exit region serving as the second region.

(1) If it is determined that there is no obstacle in both the danger region and the exit region based on the sensor information from the sensor circuit 4, the self-driving control device 9 performs control such that the vehicle enters the danger region. If it is determined that there is no obstacle in the danger region while there is an obstacle in the exit region, control is performed such that the vehicle does not enter the danger region and stops before the danger region. For example, in the case of the turning right shown in FIG. 4A, if it is determined that there is no obstacle in the danger region 130-1 and the exit region 140-3, the self-driving control device 9 performs control such that the vehicle enters the danger region 130-1. If it is determined that there is no obstacle in the danger region 130-1 while there is an obstacle in the exit region 140-3, control is performed such that the vehicle does not enter the danger region 130-1 and stops before the danger region 130-1. In this way, even when the vehicle 1 attempts to pass through the danger region 130-1, the vehicle 1 stops before the danger region 130-1 if the vehicle 1 cannot enter the exit region 140-3 beyond the danger region 130-1.

(2) In a case where the sensor circuit 4 can detect an obstacle in a third region that is not located on the traveling route of the vehicle 1 and is adjacent to the danger region, the self-driving control device 9 performs control such that the vehicle enters the danger region if it is determined that there is no obstacle in the danger region, there is no obstacle in the exit region and there is no obstacle moving toward the exit region in the third region. If it is determined that there is no obstacle in the danger region and there is no obstacle in the exit region while there is an obstacle moving toward the exit region in the third region, control is performed such that the vehicle does not enter the danger region and stops before the danger region. The third region is associated with the map information stored in the map information storage circuit 3 in the same manner as the first region and the second region described above.

Figure 6:
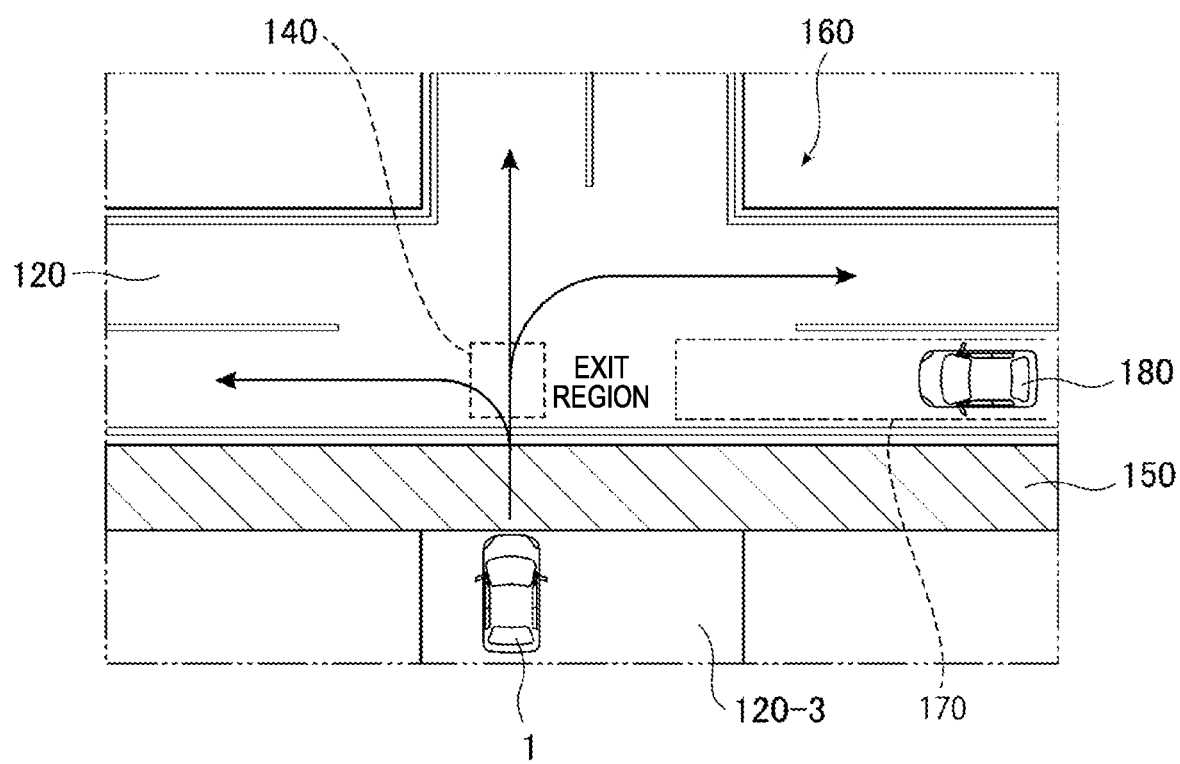
FIG. 6 shows self-driving control at an intersection in a case where a sensor circuit of the vehicle of the first embodiment can detect an obstacle in a third region which is not located on a traveling route of the vehicle and is adjacent to a danger region.

FIG. 6 shows self-driving control at the intersection 160 in the case where the sensor circuit 4 can detect an obstacle in the third region that is not located on the traveling route of the vehicle 1 and is adjacent to the danger region. In FIG. 6, control is performed such that the vehicle enters the sidewalk 150 if it is determined that there is no obstacle on the sidewalk 150 which is the danger region, there is no obstacle in the exit region 140, and there is no vehicle 180 moving toward the exit region 140 in a third region 170. Control is performed such that the vehicle does not enter the sidewalk 150 and stops before the sidewalk 150 if it is determined that there is no obstacle on the sidewalk 150 and there is no obstacle in the exit region 140 while there is a vehicle 180 moving toward the exit region 140 in the third region 170.

(3) The self-driving control device 9 may also have a function of estimating movement of an obstacle, and may perform the control through using such a function. For example, in a case where the sensor circuit 4 can detect an obstacle in the third region which is not located on the traveling route of the vehicle 1 and is adjacent to the danger region, the self-driving control device 9 performs control such that the vehicle does not enter the sidewalk 150 and stops before the sidewalk 150 if there is no obstacle on the sidewalk 150 and there is no obstacle in the exit region 140 while there is an vehicle 180 moving toward the exit region 140 in the third region 170 and the vehicle 180 moving toward the exit region 140 is estimated to arrive at the exit region 140 earlier than the host vehicle (the vehicle 1).

(4) The self-driving control device 9 performs control such that the vehicle enters the sidewalk 150 if there is no obstacle on the sidewalk 150 and there is no obstacle in the exit region 140 while there is an vehicle 180 moving toward the exit region 140 in the third region 170, and the vehicle 180 moving toward the exit region 140 is estimated to arrive at the exit region 140 later than the host vehicle (the vehicle 1).

(5) The self-driving control device 9 performs control such that the vehicle enters the sidewalk 150 if there is no obstacle on the sidewalk 150 while there is a vehicle 180 in the exit region 140 and the vehicle 180 in the exit region 140 is estimated to leave the exit region 140 before the host vehicle (the vehicle 1) arrives at the exit region 140.

(6) The self-driving control device 9 performs control such that the vehicle enters the sidewalk 150 in a case where: the obstacle in the exit region 140 is undetectable by the sensor circuit 4; and the sensor circuit 4 detects another vehicle 180 on the roadway 120, and a speed of the vehicle 180 along the roadway 120 is higher than a predetermined speed. For example, the control is performed such that the vehicle enters the sidewalk 150 at a first speed. The control of (6) is, for example in FIG. 5B, control performed in a case where the vehicle 1 and the vehicle 180 (not shown) both travel on the roadway 120-1 (a predetermined route) toward the exit region 140. If the speed of the other vehicle 180 is faster than that of the vehicle 1, the vehicle 1 can enter the sidewalk 150 since the vehicle 1 travels behind the vehicle 180.

(7) The self-driving control device 9 performs control such that the vehicle enters the sidewalk 150 at a second speed which is lower than the first speed in a case where: the obstacle in the exit region 140 is undetectable by the sensor circuit 4; and the sensor circuit 4 detects the other vehicle 180 on the roadway 120, and the speed of the vehicle 180 along the roadway 120 is lower than the predetermined speed. As in the case of (6) described above, in FIG. 5B, the control of (7) is performed in the case where the vehicle 1 and the vehicle 180 (not shown) both travel on the roadway 120-1 (the predetermined route) toward the exit region 140. If the speed of the other vehicle 180 is lower than the first speed (the predetermined speed), the vehicle 1 enters the sidewalk 150 at the second speed that is lower than the first speed so as travel behind the vehicle 180.

In this way, the self-driving control device 9 sets the intersection, the sidewalk, and the pedestrian crossing as the danger region, further sets the region beyond the danger region as the exit region, and performs control such that the vehicle does not enter the intersection, the sidewalk and the pedestrian crossing in a case where the host vehicle (the vehicle 1) cannot enter the set exit region or it is predicted that such a situation will occur soon, so that the vehicle does not get stuck in the danger region, and safety of the self-driving can thus be improved.

Next, an operation of the self-driving control device 9 mounted on the vehicle 1 of the first embodiment will be described. In the description, although a subject of the sentences should be the CPU 94 since a subject of the operation is the CPU 94, the subject of the sentences will be the self-driving control device 9 since the operation is described as an operation of the device.

Figure 7:
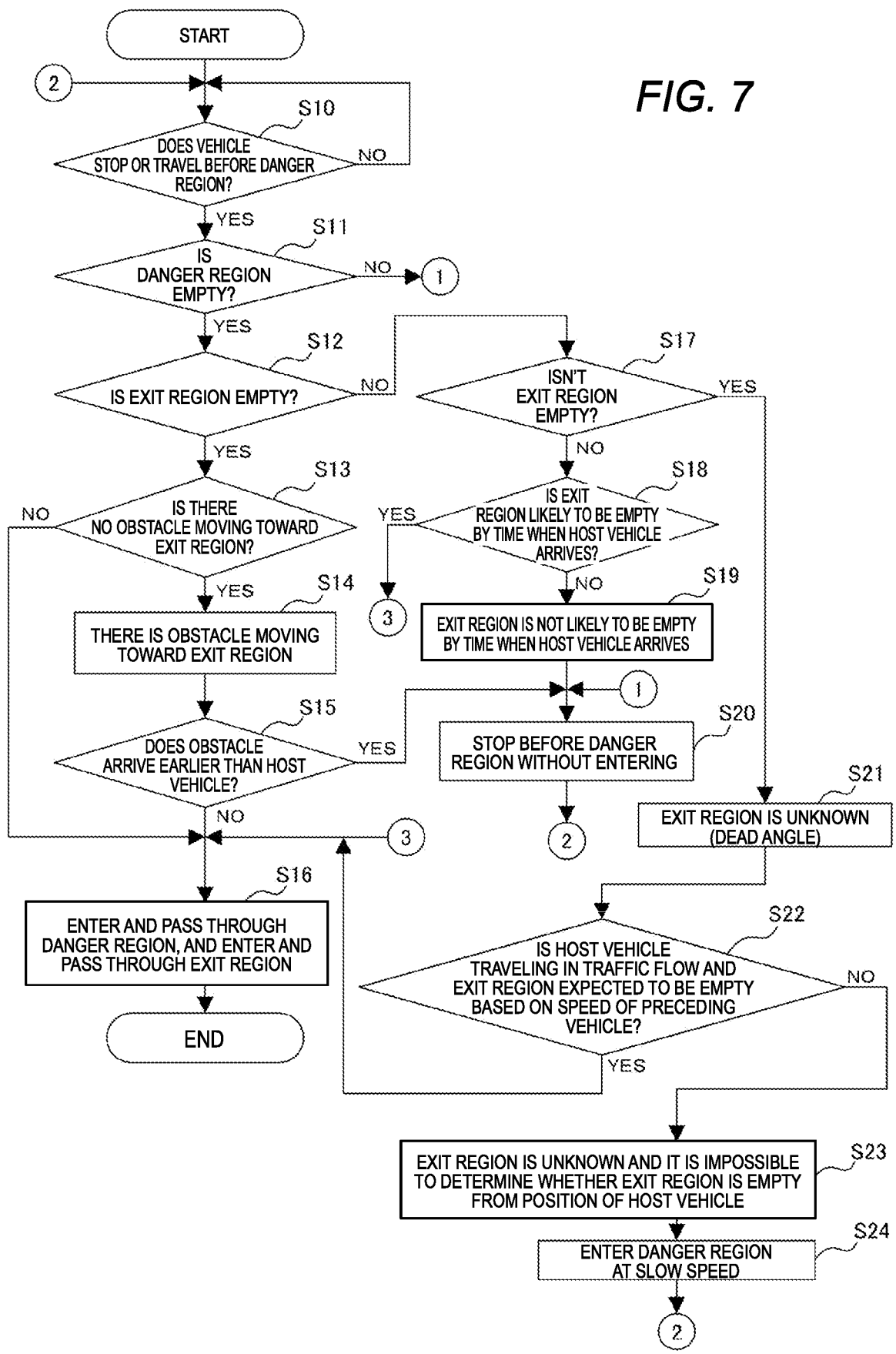
FIG. 7 is a flowchart showing basic operation steps of a self-driving control device mounted on the vehicle of the first embodiment.

FIG. 7 is a flowchart showing basic operation steps of the self-driving control device 9 mounted on the vehicle 1 of the first embodiment. In FIG. 7, the self-driving control device 9 determines "whether the vehicle stops or travels immediately before the danger region" (step S10). If it is determined as being "NO" in step S10, the self-driving control device 9 repeats the present process until it is determined as being "YES". On the other hand, if it is determined as being "YES" in step S10, the self-driving control device 9 determines "whether the danger region (intersection, sidewalk or pedestrian crossing) is empty" (step S11). If it is determined as being "YES" in step S11, the self-driving control device 9 determines "whether the exit region is empty" (step S12). If it is determined as being "YES" in step S12, the self-driving control device 9 determines "whether there is no obstacle (obstacles outside the vehicle, such as vehicles, motorcycles, people, bicycles, and wheelchairs) moving toward the exit region" (step S13).

If it is determined as being "YES" in step S13, the self-driving control device 9 recognizes that "there is an obstacle moving toward the exit region" (step S14). Then the self-driving control device 9 determines "whether the obstacle will arrive earlier than the host vehicle" (step S15). If it is determined as being "NO", the vehicle enters the danger region, and enters and passes through the exit region after passing through the danger region (step S16). After passing through the exit region, the present process is ended. On the other hand, if it is determined as being "YES" in step S15, the self-driving control device 9 does not enter the danger region and stops before the danger region (step S20), and returns to step S10.

If it is determined as being "NO" in step S13, the self-driving control device 9 directly proceeds to step S16 without performing the processes of step S15 and step S15, the vehicle enters the danger region, and enters and passes through the exit region after passing through the danger region. After passing through the exit region, the present process is ended.

If it is determined as being "NO" in step S11, the self-driving control device 9 does not enter the danger region and stops before the danger region (step S20), and returns to step S10.

If it is determined as being "NO" in step S12, the self-driving control device 9 determines "whether the exit region is not empty" (step S17). If it is determined as being "NO" in step S17, the self-driving control device 9 determines "whether the exit region is likely to be empty by the time when the host vehicle arrives" (step S18). If it is determined as being "YES" in step S18, the self-driving control device 9 proceeds to step S16, the vehicle enters the danger region, and enters and passes through the exit region after passing through the danger region. After passing through the exit region, the present process is ended. On the other hand, if it is determined as being "NO" in step S18, the self-driving control device 9 recognizes that "the exit region is not likely to be empty by the time when the host vehicle arrives" (step S19), and the vehicle does not enter the danger region and stops before the danger region (step S20), and the process returns to step S10.

If it is determined as being "YES" in step S17, the self-driving control device 9 recognizes that "the exit region is unknown (dead angle)" (step S21). Next, the self-driving control device 9 determines "whether the host vehicle is traveling in a traffic flow and the exit region is expected to be empty depending on a speed of a preceding vehicle" (step S22). If it is determined as being "YES", the process proceeds to step S16, the vehicle enters the danger region, and enters and passes through the exit region after passing through the danger region. After passing through the exit region, the present process is ended. On the other hand, if it is determined as being "NO" is determined in step S22, the self-driving control device 9 recognizes that "the exit region is unknown and it is not possible to determine whether the exit region is empty from the position of the host vehicle" (step S23), the vehicle enters the danger region at a slow speed (step S24), and the process returns to step S10.

As described above, the vehicle 1 of the first embodiment detects the obstacles outside the vehicle, such as vehicles, motorcycles, people, bicycles, and wheelchairs, in the danger region of the intersections, the sidewalks and the pedestrian crossings on the planned future route and in the exit region which is adjacent to the danger region and is farther than the danger region. The vehicle enters the danger region in a case where there is no obstacle in both the danger region and the exit region, and the vehicle does not enter the danger region and stops before the danger region in a case where there is no obstacle in the danger region while there is an obstacle in the exit region, so that dangerous situations, such as being stuck at the intersections, the sidewalks and the pedestrian crossings, can be avoided.

In the case where the vehicle 1 of the first embodiment can detect the obstacle in the third region which is not located on the traveling route and is adjacent to the danger region, the vehicle enters the danger region in a case where there is no obstacle in the danger region, there is no obstacle in the exit region, and there is no obstacle moving toward the exit region in the third region, and the vehicle does not enter the danger region and stops before the danger region in a case where there is no obstacle in the danger region, there is no obstacle in the exit region, there is an obstacle moving toward the exit region in the third region while the obstacle is estimated to arrive at the exit region earlier than the host vehicle (the vehicle 1), so that dangerous situations with respect to the obstacle in the third region which is not located on the traveling route can be avoided. On the other hand, the vehicle enters the danger region in a case where the obstacle is estimated to arrive at the exit region later than the host vehicle (the vehicle 1).

The vehicle 1 of the first embodiment enters the danger region in a case where there is no obstacle in the danger region and the obstacle in the exit region is estimated to leave the exit region before the host vehicle (the vehicle 1) arrives at the exit region, so that the vehicle 1 can travel smoothly without being stuck in the danger region.

In the case where the obstacle in the exit region is undetectable by the sensor circuit 4, the sensor circuit 4 detects another vehicle 180 on the same roadway, and the speed of the other vehicle 180 along the same roadway is higher than the predetermined speed, the vehicle 1 of the first embodiment enters the danger region at the first speed, and in the case where the speed of the other vehicle 180 along the same roadway is lower than the predetermined speed, the vehicle enters the danger region at the second speed which is lower than the first speed. Therefore, the vehicle travels behind another vehicle 180 in any case, and thus the vehicle can travel smoothly while avoiding dangerous situations such as colliding with another vehicle 180.

Second Embodiment

A vehicle 200 of a second embodiment can autonomously travel on the predetermined traveling route in the same manner as the vehicle 1 of the first embodiment described above. In particular, the vehicle 200 of the second embodiment can ensure safety during overtaking. A configuration of a portion related to self-driving of the vehicle 200 of the second embodiment is the same as that of the vehicle 1 of the first embodiment described above, so that FIG. 1 is referred to. However, since a part of functions of the self-driving control device are different, different reference numerals are assigned to the self-driving control device and the memory which constitutes the self-driving control device. In this case, "201" is assigned to the self-driving control device, and "202" is assigned to the memory constituting the self-driving control device 201.

The memory 202 includes: a ROM dedicated to data reading (not shown); a RAM capable of rewriting data (not shown); and a read-only flash ROM capable of electrically erasing and rewriting data (not shown). The ROM stores a basic program configured to start the CPU 94 when power is turned on. The RAM is used in an operation of the CPU 94, and the flash ROM stores a program that supports self-driving control of the vehicle 200.

For example, when the vehicle 200 overtakes a vehicle ahead (a vehicle existing in the front regardless of whether the vehicle is traveling or stopped) on a roadway with one lane on each side, there is a case where the vehicle 200 can perform the overtaking in the same lane although a part of the vehicle 200 may protrude to an adjacent lane, or a case where the vehicle 200 travels to the adjacent lane (an oncoming lane) to perform the overtaking. In the latter case, it is necessary to particularly pay attention to oncoming vehicles since the vehicle 200 travels to the oncoming lane. In order to perform the overtaking, the self-driving control device 201 mounted on the vehicle 200 of the second embodiment confirms the oncoming lane and confirms whether there is any temporarily stopped vehicle, such as traffic congestion, and whether there is space for returning. In order to perform such confirmation, a travel control function of the self-driving control device 201 includes the following four functions.

(Function 1) Based on image data from a camera (not shown) of the sensor circuit 4, confirming whether the brake lamps 13R, 13L and 14 (see FIG. 3) of another vehicle are lit (lighting of the brake lamps 13R, 13L and 14 indicates the temporarily stopped vehicle), and confirming whether the winker lamps 15R, 15L of the other vehicle are lit.

(Function 2) Predicting a parked vehicle based on a size of space on a right side of a vehicle being parked on a left side of a road.

(Function 3) Predicting a vehicle in the traffic congestion at a place, such as in the vicinity of an intersection or a pedestrian crossing, or in the vicinity of a traffic light, from a map.

(Function 4) Detecting space for returning ahead of a vehicle to be overtaken when traveling on a right side in front of the vehicle to be overtaken.

Figure 8:
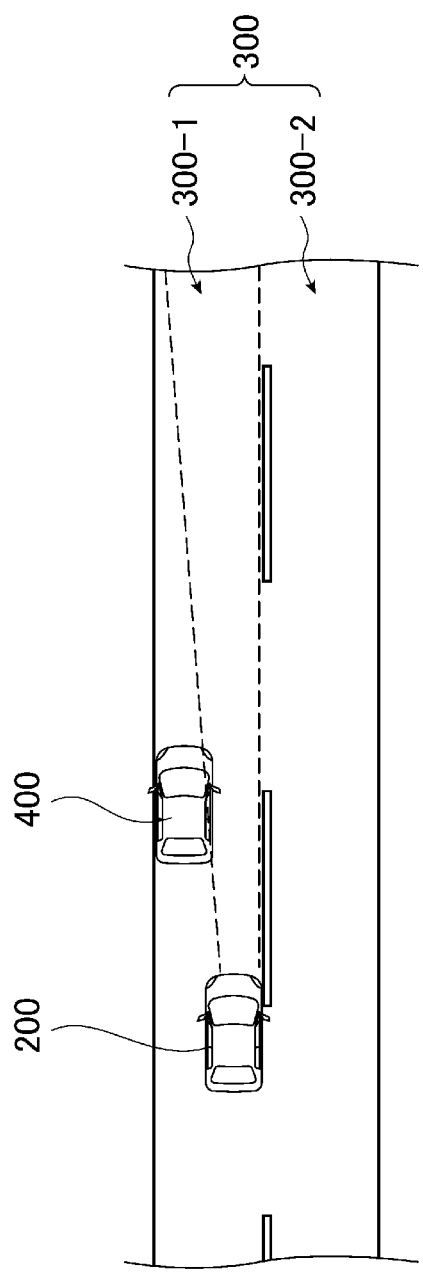
FIG. 8 shows control performed at the time when a self-driving control device mounted on a vehicle of a second embodiment performs overtaking in the same lane on a road with one lane on each side.
Figure 9:
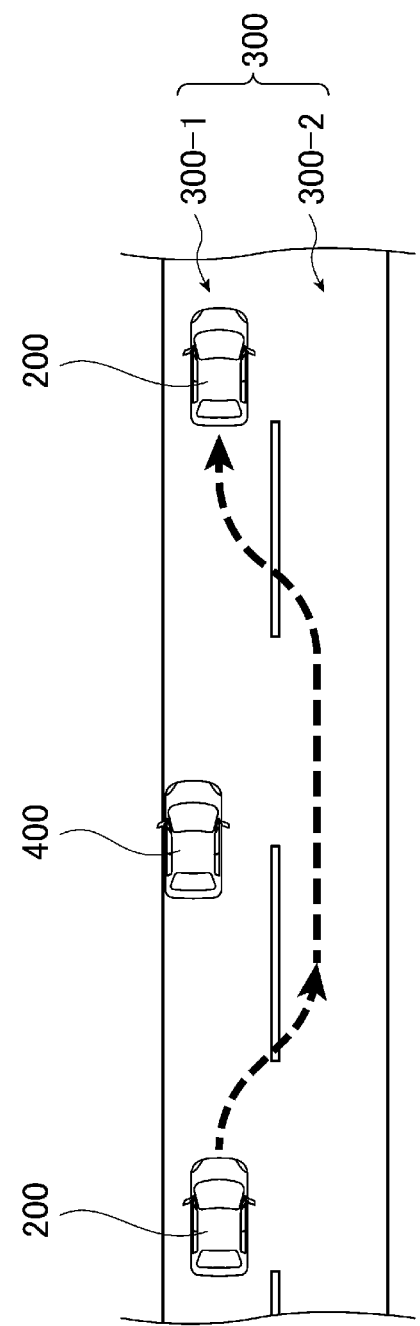
FIG. 9 shows control performed at the time when the self-driving control device mounted on the vehicle of the second embodiment travels to an adjacent second lane to perform the overtaking on the road with one lane on each side.
Figure 10:
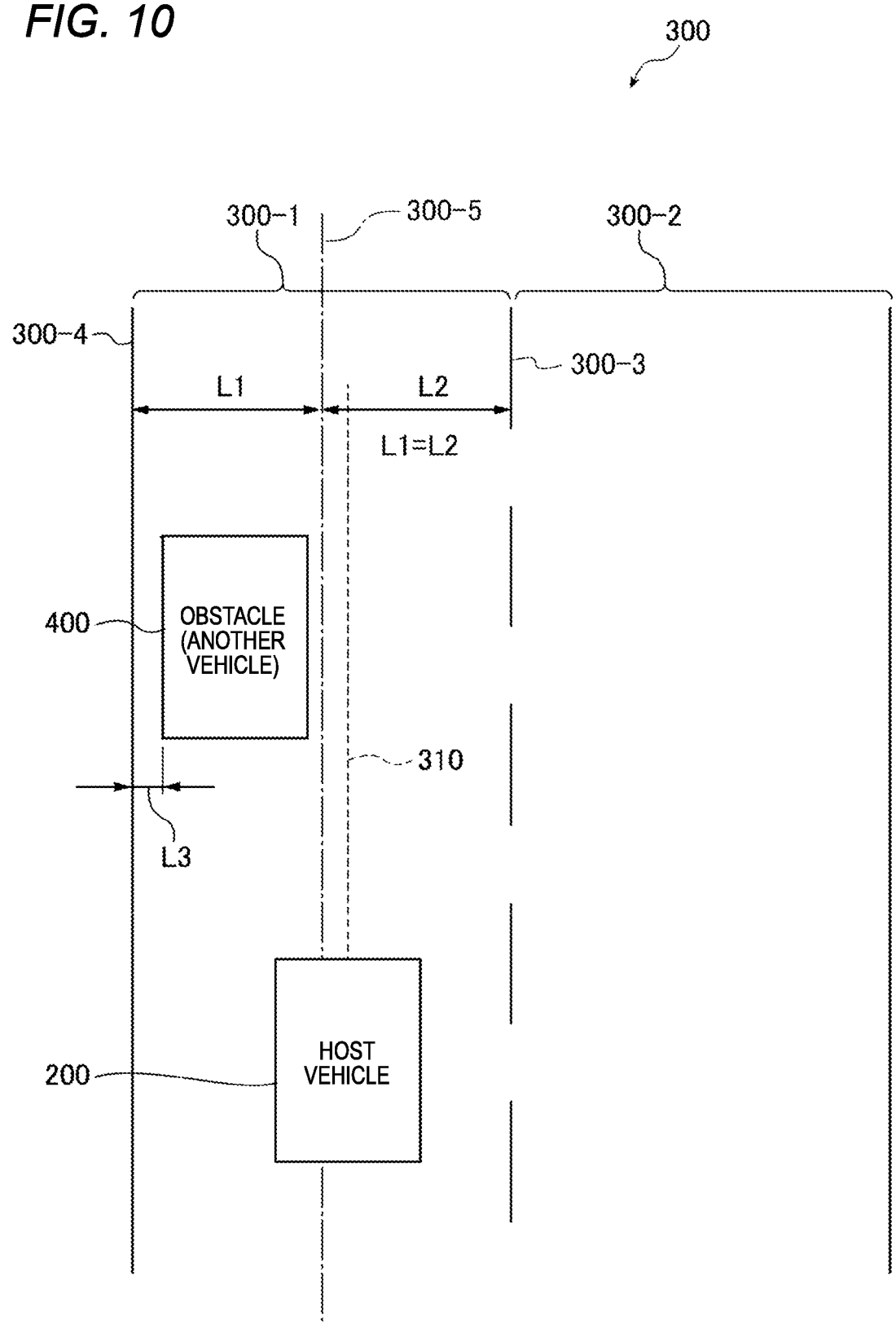
FIG. 10 shows details of the road with one lane on each side.

Since the self-driving control device 201 has the four functions described above, the overtaking can be performed more safely. FIG. 8 shows overtaking control of the self-driving control device 201 at the time when the overtaking is performed in the same lane on a road with one lane on each side. FIG. 9 shows the overtaking control of the self-driving control device 201 at the time when the vehicle travels to an adjacent lane (an oncoming lane) to perform the overtaking on the road with one lane on each side. FIG. 10 shows details of the road with one lane on each side. It should be noted that the road is not limited be with one lane on each side, and may also be with two lanes on each side, three lanes on each side, four lanes on each side, or the like, while the road with one lane on each side is taken as an example in the present disclosure.

As shown in FIG. 10, a road 300 includes a first lane 300-1 and a second lane 300-2 which is adjacent to the first lane 300-1. The second lane 300-2 is an oncoming lane of the first lane 300-1 and has the same width as that of the first lane 300-1. A boundary between the first lane 300-1 and the second lane 300-2 is referred to as a first boundary line (boundary line) 300-3. The first lane 300-1 includes a second boundary line 300-4 which is opposite to the first boundary line 300-3 and indicates a boundary between the first lane 300-1 and another region. A center line 300-5 of the first lane 300-1 is a virtual line, and is usually invisible.

The vehicle 200 travels on a traveling route (a predetermined traveling route) 310 in the first lane 300-1, and an obstacle (for example, "another vehicle") 400 is stopped in front of the vehicle 200 on a left side. In such a situation, when overtaking the obstacle 400 in the first lane 300-1, at first, the self-driving control device 201 mounted on the vehicle 200 predicts that the obstacle 400 ahead is a parked vehicle by the above described (Function 1) and (Function 2). The prediction of the parked vehicle is based on the fact that a speed is "0", the brake lamps 13R, 13L and 14 are not lit, and the winker lamps 15R, 15L are not lit. In this case, it is not necessary to meet all these conditions, and for example, the prediction may be based only on the fact that the brake lamps 13R, 13L and 14 are not lit, or the fact that the brake lamps 13R, 13L and 14 are not lit while the winker lamps 15R, 15L are not lit.

If the self-driving control device 201 predicts that the obstacle 400 is a parked vehicle, the vehicle 200 (the host vehicle) is moved rightward such that the vehicle 200 can pass beside the obstacle 400. Next, if it is confirmed by the above (Function 3) that there is no vehicle queue or the like in the traffic congestion ahead of the obstacle 400, the overtaking is started. The self-driving control device 201 performs detection of the space for returning by the above (Function 4) in response to start of the overtaking, and if the space for returning can be confirmed, the vehicle 200 is returned to the original traveling route after the overtaking.

On the other hand, in the case of traveling to the second lane 300-2 which is the oncoming lane to overtake the obstacle 400, the vehicle 200 (the host vehicle) is moved rightward if the self-driving control device 201 predicts by the above (Function 1) and (Function 2) that the obstacle 400 ahead is a parked vehicle. If it is confirmed by the above (Function 3) that there is no vehicle queue or the like in the traffic congestion ahead of the obstacle 400, the vehicle 200 travels to the second lane 300-2 and starts the overtaking. The self-driving control device 201 performs detection of the space for returning by the above (Function 4) in response to start of the overtaking, and if the space for returning can be confirmed, the vehicle 200 is returned to the original lane (that is, the first lane 300-1) after the overtaking.

The above is the basic operation of the self-driving control device 201. The self-driving control device 201 can further perform the following control.

(1) In a case where there is a first obstacle (not shown) related to the traveling route 310 and moving at a speed lower than a predetermined speed (a speed of the vehicle 200) while the vehicle 200 is traveling on the traveling route 310 of the first lane 300-1, the self-driving control device 201 performs control such that the vehicle 200 approaches the first boundary line 300-3 between the first lane 300-1 and the second lane 300-2 from the traveling route 310, and performs control such that the sensor circuit 4 detects a second obstacle (not shown) in the traveling direction after approaching the first boundary line 300-3. The speed which is lower than the predetermined speed (the speed of the vehicle 200) includes a speed at stopping.

(2) In the case where there is a first obstacle (not shown) related to the traveling route 310 and moving at a speed lower than the predetermined speed while the vehicle 200 is traveling on the traveling route 310 of the first lane 300-1, the self-driving control device 201 performs control such that the vehicle 200 approaches the first boundary line 300-3 from the traveling route 310 and travels without crossing the first boundary line 300-3.

(3) In the case where: there is a first obstacle (not shown) related to the traveling route 310 and moving at a speed lower than the predetermined speed while the vehicle 200 is traveling on the traveling route 310 of the first lane 300-1; and the first obstacle moving at the speed lower than the predetermined speed is farther from the second boundary line 300-4 than the vehicle (the host vehicle) 200, the self-driving control device 201 performs control such that the vehicle 200 approaches the first boundary line 300-3 from the traveling route 310.

(4) In the case where: there is a first obstacle (not shown) related to the traveling route 310 and moving at a speed lower than the predetermined speed while the vehicle 200 is traveling on the traveling route 310 of the first lane 300-1; and a distance L3 (see FIG. 10) between the first obstacle moving at the speed lower than the predetermined speed and the second boundary line 300-4 is smaller than a predetermined distance, the self-driving control device 201 performs control such that the vehicle 200 approaches the first boundary line 300-3 from the traveling route 310.

(5) In the case where: there is a first obstacle (not shown) related to the traveling route 310 and moving at a speed lower than the predetermined speed while the vehicle 200 is traveling on the traveling route 310 of the first lane 300-1; and an end portion closer to the first boundary line 300-3 of the first obstacle moving at the speed lower than the predetermined speed is closer to the second boundary line 300-4 than the center line 300-5 between the first boundary line 300-3 and the second boundary line 300-4, the self-driving control device 201 performs control such that the vehicle 200 approaches the first boundary line 300-3 from the traveling route 310.

(6) In the case where: there is a first obstacle (not shown) related to the traveling route 310 and moving at a speed lower than the predetermined speed while the vehicle 200 is traveling on the traveling route 310 of the first lane 300-1; and there is no predetermined facility within a predetermined distance ahead, the self-driving control device 201 performs control such that the vehicle 200 approaches the first boundary line 300-3 between the first lane 300-1 and the second lane 300-2 from the traveling route 310. In the case where: there is a first obstacle (not shown) related to the traveling route 310 and moving at the speed lower than the predetermined speed while the vehicle 200 is traveling on the traveling route (the predetermined traveling route) 310 of the first lane 300-1; and there is a predetermined facility within the predetermined distance ahead, the self-driving control device 201 performs control such that the vehicle 200 travels on the traveling route 310 and stops before the first obstacle. Here, the predetermined facility is at least one of an intersection, a pedestrian crossing, or an exit or entrance of a commercial facility.

(7) In a case where the sensor circuit 4 tries to detect the second obstacle (not shown) in the traveling direction and detects at least the second obstacle ahead of the first obstacle (not shown) after the vehicle 200 approaches the first boundary line 300-3, the self-driving control device 201 performs control such that the vehicle 200 stops before the first obstacle.

(8) In a case where the sensor circuit 4 detects at least the second obstacle (not shown) ahead of the first obstacle (not shown), the self-driving control device 201 performs control such that the vehicle 200 stops before the first obstacle without crossing the first boundary line 300-3.

(9) In a case where at least the second obstacle (not shown) is not detected ahead of the first obstacle (not shown), the self-driving control device 201 performs control such that the vehicle 200 travels beside the first obstacle in a state where at least a part of the vehicle 200 crosses the first boundary line 300-3.

(10) In the case where: at least the second obstacle (not shown) is not detected ahead of the first obstacle (not shown); and the sensor circuit 4 detects that predetermined space is available on the first lane 300-1 while the vehicle 200 travels beside the first obstacle in the state where at least a part of the vehicle 200 crosses the first boundary line 300-3, the self-driving control device 201 performs control such that the vehicle 200 returns to the traveling route (the predetermined traveling route) 310.

Next, an operation of the self-driving control device 201 mounted on the vehicle 200 of the second embodiment will be described. In the description, although a subject of the sentences should be the CPU 94 since a subject of the operation is the CPU 94, the subject of the sentences will be the self-driving control device 201 since the operation is described as an operation of the device.

Figure 11:
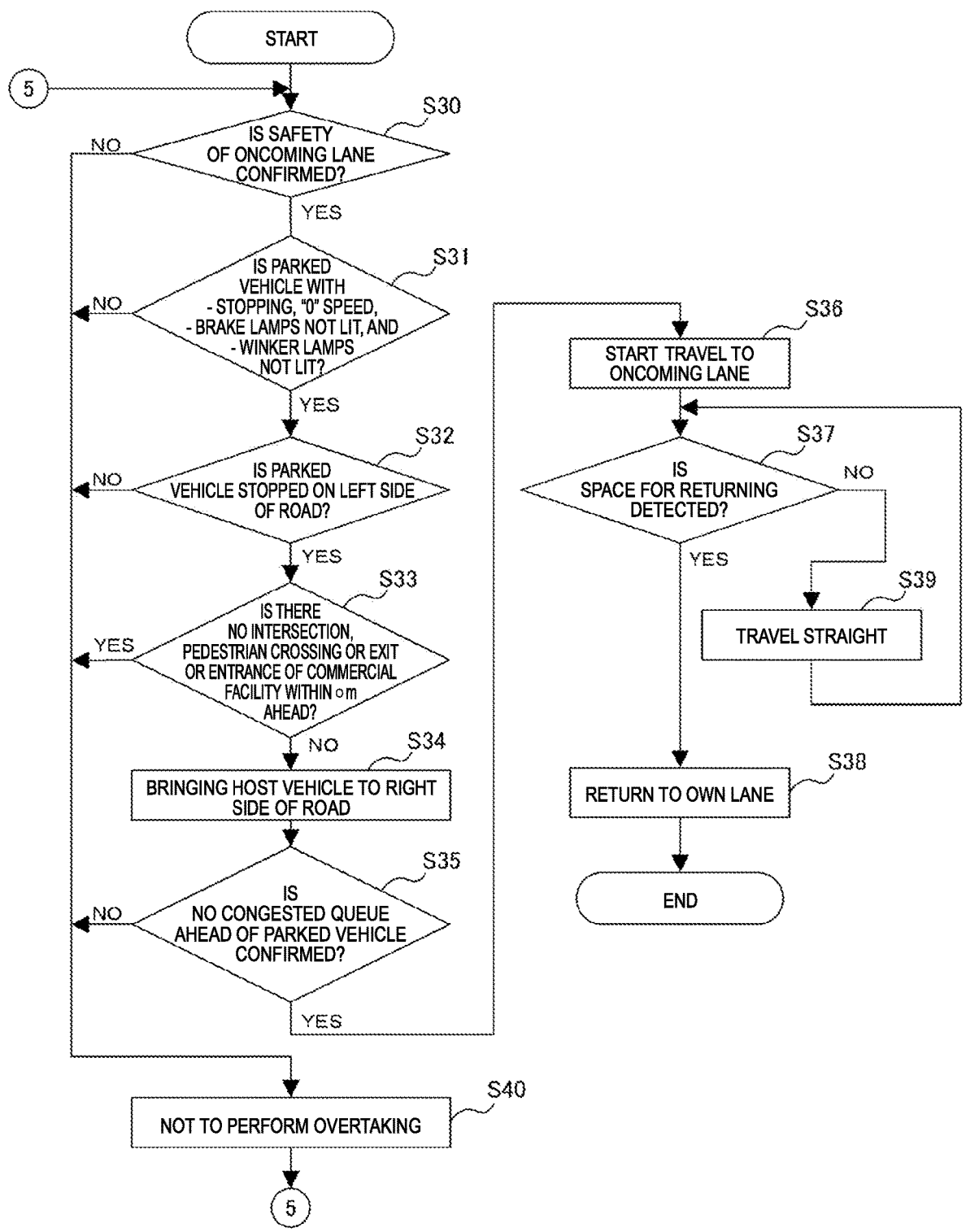
FIG. 11 is a flowchart showing basic operation steps of the self-driving control device mounted on the vehicle of the second embodiment.

FIG. 11 is a flowchart showing basic operation steps of the self-driving control device 201 mounted on the vehicle 200 of the second embodiment. In FIG. 11, the self-driving control device 201 determines "whether safety of the oncoming lane is confirmed" (step S30). If it is determined as being "NO" in step S30, the self-driving control device 201 recognizes "not to perform overtaking" (step S40), and the process returns to step S30. On the other hand, if it is determined as being "YES" in step S30, the self-driving control device 201 determines "whether the parked vehicle is stopped, a speed thereof is "0", the brake lamps thereof are not lit, and the winker lamps thereof are not lit" (step S31).

If it is determined as being "NO" in step S31, the self-driving control device 201 recognizes "not to perform overtaking" (step S40), and the process returns to step S30. On the other hand, if it is determined as being "YES" is determined in step S31, the self-driving control device 201 determines "whether the parked vehicle is stopped on the left side of the road" (step S32).

If it is determined as being "NO" in step S32, the self-driving control device 201 recognizes "not to perform overtaking" (step S40), and the process returns to step S30. On the other hand, if it is determined as being "YES" in step S32, the self-driving control device 201 determines "whether there is no intersection, pedestrian crossing and exit or entrance of a commercial facility within ○ m ahead" (step S33). The ○ m ahead is, for example, 50 m ahead. Alternatively, the ○ m may also be 100 m, 40 m, 30 m, 20 m, or 10 m. If it is determined as being "YES" in step S33, the self-driving control device 201 recognizes "not to perform overtaking" (step S40), and the process returns to step S30. On the other hand, if it is determined as being "NO" in step S33, control of "bringing the host vehicle (the vehicle 200) to the right side of the road" is performed (step S34).

Next, the self-driving control device 201 determines "whether no congested queue ahead of the parked vehicle is confirmed" (step S35). If it is determined as being "YES" is determined in step S35, the self-driving control device 201 recognizes "not to perform overtaking" (step S40), and the process returns to step S30. On the other hand, if it is determined as being "NO" is determined in step S35, the self-driving control device 201 performs control of "traveling to the oncoming lane" (step S36).

Next, the self-driving control device 201 determines "whether space for returning is detected" (step S37). If it is determined as being "NO" in step S37, the self-driving control device 201 performs control of "traveling straight" (step S39), and the process returns to step S37. On the other hand, if it is determined as being "YES" in step S37, the self-driving control device 201 performs control of "returning to the own lane" (step S38). When the host vehicle returns to the own lane, the present process is ended. Step S33 described above is not essential and may be omitted.

As described above, the sensor circuit 4 detects the second obstacle in the traveling direction after the vehicle 200 of the second embodiment approaches the first boundary line 300-3 between the first lane 300-1 and the second lane 300-2 of the road 300 to perform the overtaking, so that whether there is space for returning to the route of the host vehicle at a destination of the overtaking can be confirmed, and therefore safety during overtaking can be ensured.

Although the present disclosure is described in detail with reference to specific embodiments, it will be apparent to those skilled in the art that various changes and modifications may be made without departing from the spirit and scope of the disclosure.

The present application is based on Japanese Patent Application No. 2018-056723 filed on Mar. 23, 2018, the contents of which are incorporated herein by reference.

The vehicle and the self-driving control device of the present disclosure are useful for vehicles such as automobiles and trucks.

The invention claimed is:

1. A vehicle comprising:
a power unit which is electrically controllable;
a steering device which is electrically controllable;
a braking device which is electrically controllable;
a sensor circuit configured to detect an external obstacle;
a processor; and
a memory storing a program,
wherein the vehicle is configured to autonomously travel on a predetermined traveling route by electrically controlling at least one of the power unit, the steering device, and the braking device,
wherein the sensor circuit is configured to detect the obstacle in a first region which is located on the predetermined traveling route and in a second region which is adjacent to the first region on the predetermined traveling route, the second region being separate from the first region and farther than the first region along the predetermined traveling route,
wherein the program, when executed by the processor, causes the processor to:
perform control such that the vehicle enters the first region in a case where: there is no obstacle in the first region; and there is no obstacle in the second region, and
perform control such that the vehicle does not enter the first region and stops before the first region in a case where: there is no obstacle in the first region; and there is an obstacle in the second region,
wherein the sensor circuit is configured to further detect an obstacle in a third region which is not located on the predetermined traveling route and is adjacent to the first region,
wherein the first region corresponds to a sidewalk,
wherein the second region is adjacent to the sidewalk and located on the predetermined traveling route, and the second region is a region located on a traveling route of another vehicle in a case where the other vehicle is present in the third region,
wherein the third region is adjacent to the sidewalk and is along the sidewalk, and
wherein the program, when executed by the processor, causes the processor to:
perform control such that the vehicle enters the first region in a case where: there is no obstacle in the first region; there is no obstacle in the second region; and there is no obstacle moving toward the second region in the third region, and
perform control such that the vehicle does not enter the first region and stops before the first region in a case where: there is no obstacle in the first region; there is no obstacle in the second region; and there is an obstacle moving toward the second region in the third region,
wherein the program, when executed by the processor, causes the processor to:
perform control such that the vehicle is prohibited from entering into the first region and stops before the first region in response to a determination that all of the following conditions are met:
there is no obstacle in the first region;
there is no obstacle in the second region;
there is an obstacle moving toward the second region in the third region; and
the obstacle moving toward the second region is estimated to arrive at the second region earlier than the vehicle, and
wherein the program, when executed by the processor, causes the processor to:
perform control such that the vehicle is permitted to enter into the first region in response to a determination that all of the following conditions are met:
there is no obstacle in the first region;
there is no obstacle in the second region; there is an obstacle moving toward the second region in the third region; and
the obstacle moving toward the second region is estimated to arrive at the second region later than the vehicle.

2. The vehicle according to claim 1,
wherein the second region does not correspond to at least an intersection, a pedestrian crossing, and the sidewalk.

3. The vehicle according to claim 2,
wherein the second region is located on a roadway.

4. The vehicle according to claim 1, further comprising:
a position information acquisition circuit configured to acquire a position of the vehicle; and
a map information storage circuit configured to store map information,
wherein the program, when executed by the processor, causes the processor to:
perform control such that the vehicle autonomously travels along the predetermined traveling route based on the position of the vehicle and the map information.

5. The vehicle according to claim 4, further comprising:
a wireless communication circuit configured to wirelessly communicate with outside,
wherein the map information stored in the map information storage circuit is rewritable with other map information input via the wireless communication circuit.

6. The vehicle according to claim 4,
wherein the first region and the second region are associated with the map information.

7. A self-driving control device mountable on a vehicle, the vehicle comprising:
a power unit which is electrically controllable;
a steering device which is electrically controllable;
a braking device which is electrically controllable; and
a sensor circuit configured to detect an external obstacle,
the vehicle being configured to autonomously travel on a predetermined traveling route by electrically controlling at least one of the power unit, the steering device, and the braking device,
the sensor circuit being configured to detect the obstacle in a first region which is located on the predetermined traveling route and in a second region which is adjacent to the first region on the predetermined traveling route, the second region being separate from the first region and farther than the first region along the predetermined traveling route, the self-driving control device comprising:

a processor; and a memory storing a program, wherein the program, when executed by the processor, causes the processor to:

perform control such that the vehicle enters the first region in a case where: there is no obstacle in the first region; and there is no obstacle in the second region, and perform control such that the vehicle does not enter the first region and stops before the first region in a case where: there is no obstacle in the first region; and there is an obstacle in the second region, wherein the sensor circuit is configured to further detect an obstacle in a third region which is not located on the predetermined traveling route and is adjacent to the first region, wherein the first region corresponds to a sidewalk, wherein the second region is adjacent to the sidewalk and located on the predetermined traveling route, and the second region is a region located on a traveling route of another vehicle in a case where the other vehicle is present in the third region, wherein the third region is adjacent to the sidewalk and is along the sidewalk, wherein the program, when executed by the processor, causes the processor to:

perform control such that the vehicle enters the first region in a case where: there is no obstacle in the first region; there is no obstacle in the second region; and there is no obstacle moving toward the second region in the third region, and perform control such that the vehicle does not enter the first region and stops before the first region in a case where: there is no obstacle in the first region; there is no obstacle in the second region; and there is an obstacle moving toward the second region in the third region, wherein the program, when executed by the processor, causes the processor to:

perform control such that the vehicle is prohibited from entering into the first region and stops before the first region in response to a determination that all of the following conditions are met:

there is no obstacle in the first region;

there is no obstacle in the second region;

there is an obstacle moving toward the second region in the third region; and the obstacle moving toward the second region is estimated to arrive at the second region earlier than the vehicle, and wherein the program, when executed by the processor, causes the processor to:

perform control such that the vehicle is permitted to enter into the first region in response to a determination that all of the following conditions are met:

there is no obstacle in the first region;

there is no obstacle in the second region; there is an obstacle moving toward the second region in the third region; and the obstacle moving toward the second region is estimated to arrive at the second region later than the vehicle.

8. The self-driving control device according to claim 7, wherein the second region does not correspond to at least an intersection, a pedestrian crossing, and the sidewalk.

9. The self-driving control device according to claim 8, wherein the second region is located on a roadway.

10. The self-driving control device according to claim 7, wherein the program, when executed by the processor, causes the processor to:

perform control such that the vehicle enters the first region in a case where: there is no obstacle in the first region; there is an obstacle in the second region; and the obstacle in the second region is estimated to arrive the second region before the vehicle arrives at the second region.

\* \* \* \* \*